United States Patent [19]
Kepros et al.

[11] Patent Number: 5,307,429
[45] Date of Patent: Apr. 26, 1994

[54] TEMPERATURE-INDEPENDENT OPTICAL COUPLER

[75] Inventors: John G. Kepros; Eldon N. Okazaki, both of Sunnyvale; Linda C. Chin, Monterey, all of Calif.

[73] Assignee: Lockheed Missiles & Space Company, Inc., Sunnnyvale, Calif.

[21] Appl. No.: 55,893

[22] Filed: May 4, 1993

[51] Int. Cl.⁵ .............................. G02B 6/26
[52] U.S. Cl. ........................ 385/15; 385/33
[58] Field of Search ............. 385/15, 31, 33, 38

[56] References Cited
U.S. PATENT DOCUMENTS 4,274,706  6/1981  Tangonan ..................... 385/37
5,136,676  8/1992  Arnett et al. .................. 385/33

Primary Examiner—Rodney B. Bovernick
Assistant Examiner—Stephen W. Barns
Attorney, Agent, or Firm—John J. Morrissey

[57] ABSTRACT

An optical coupler 13 comprises a monolithic block of transparent optical material with a pair of opposite sides configured so that an optical signal can be transmitted between a first device 12 and a second device 14 with internal reflections within the coupler 13. Because the optical coupler 13 is monolithic, thermal expansions and contractions in response to extreme fluctuations are uniformly distributed throughout the coupler 13 and therefore do not significantly distort the optical signal.

8 Claims, 5 Drawing Sheets

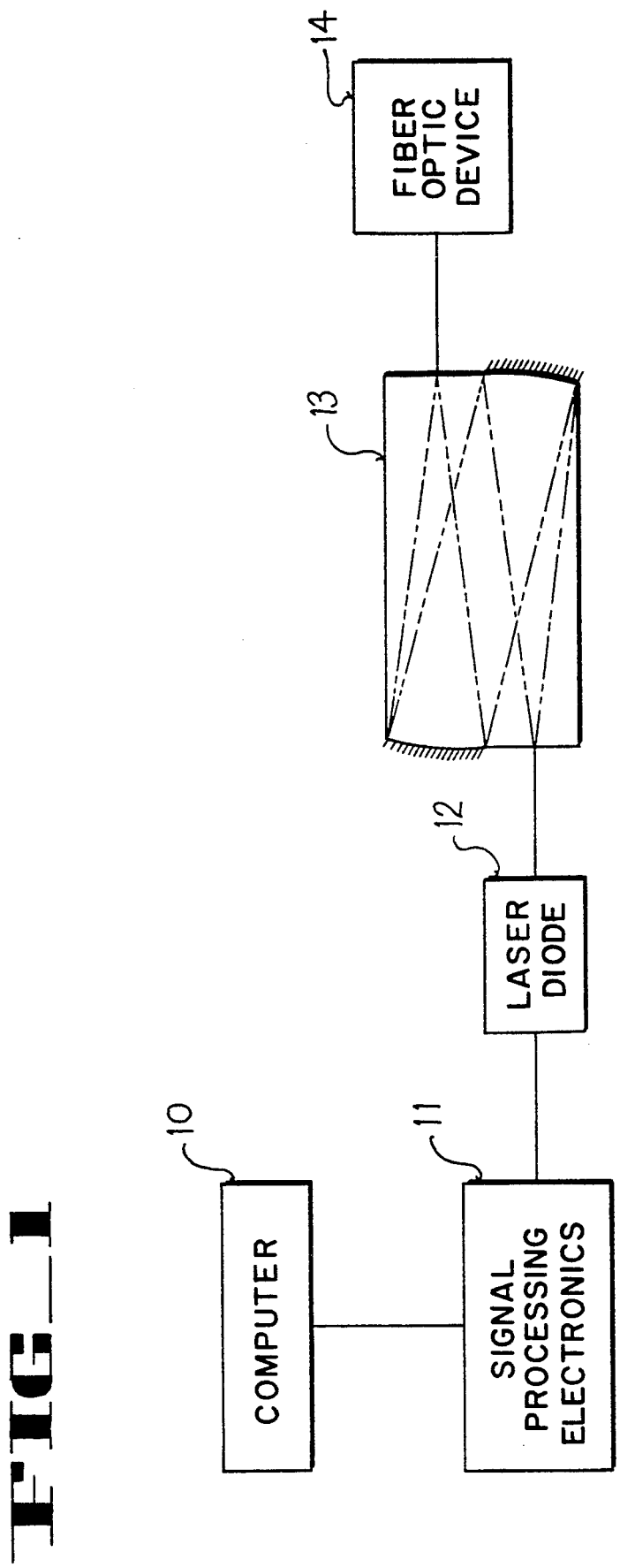
FIG_1

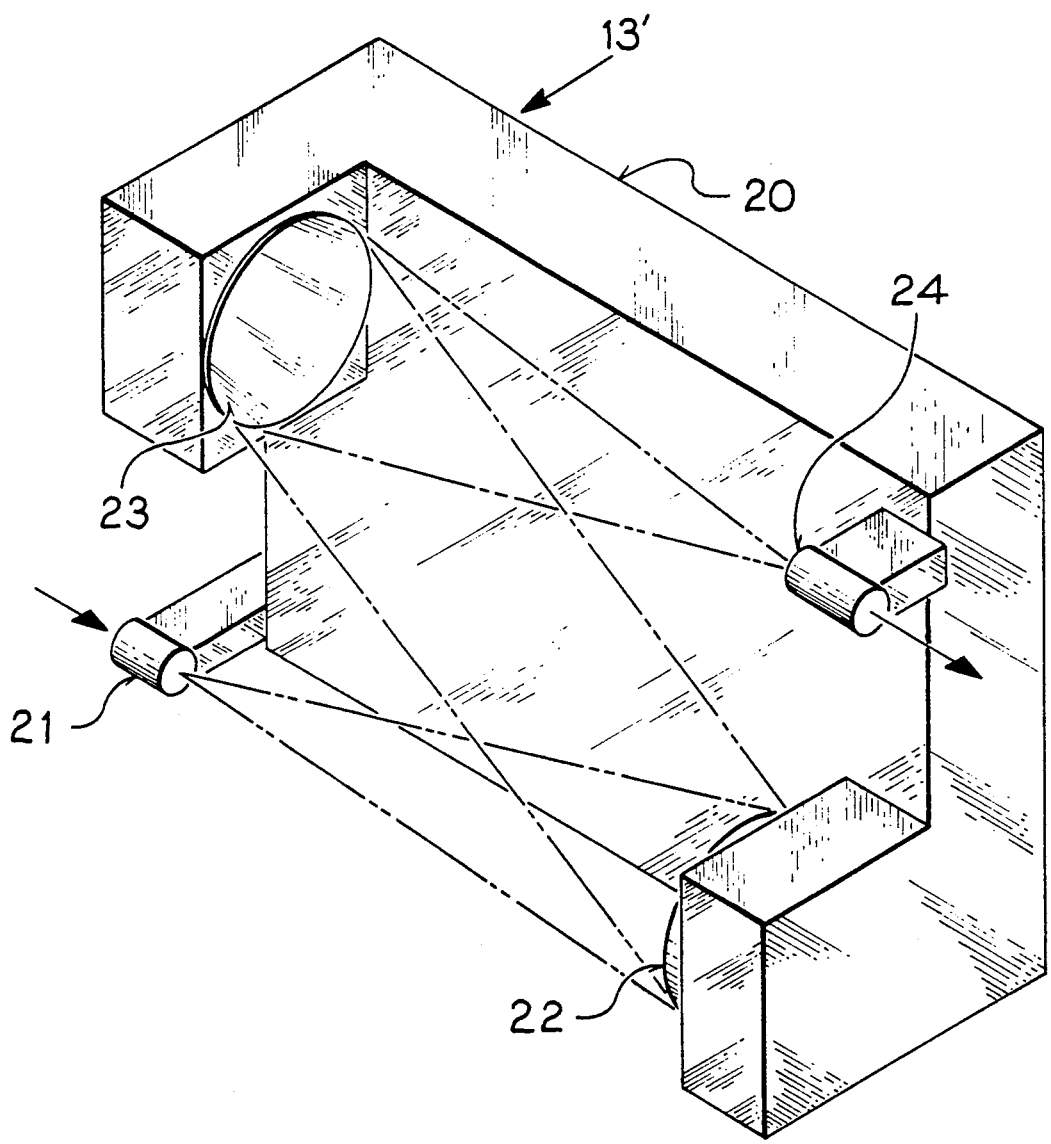
FIG_2
PRIOR ART

FIG_3
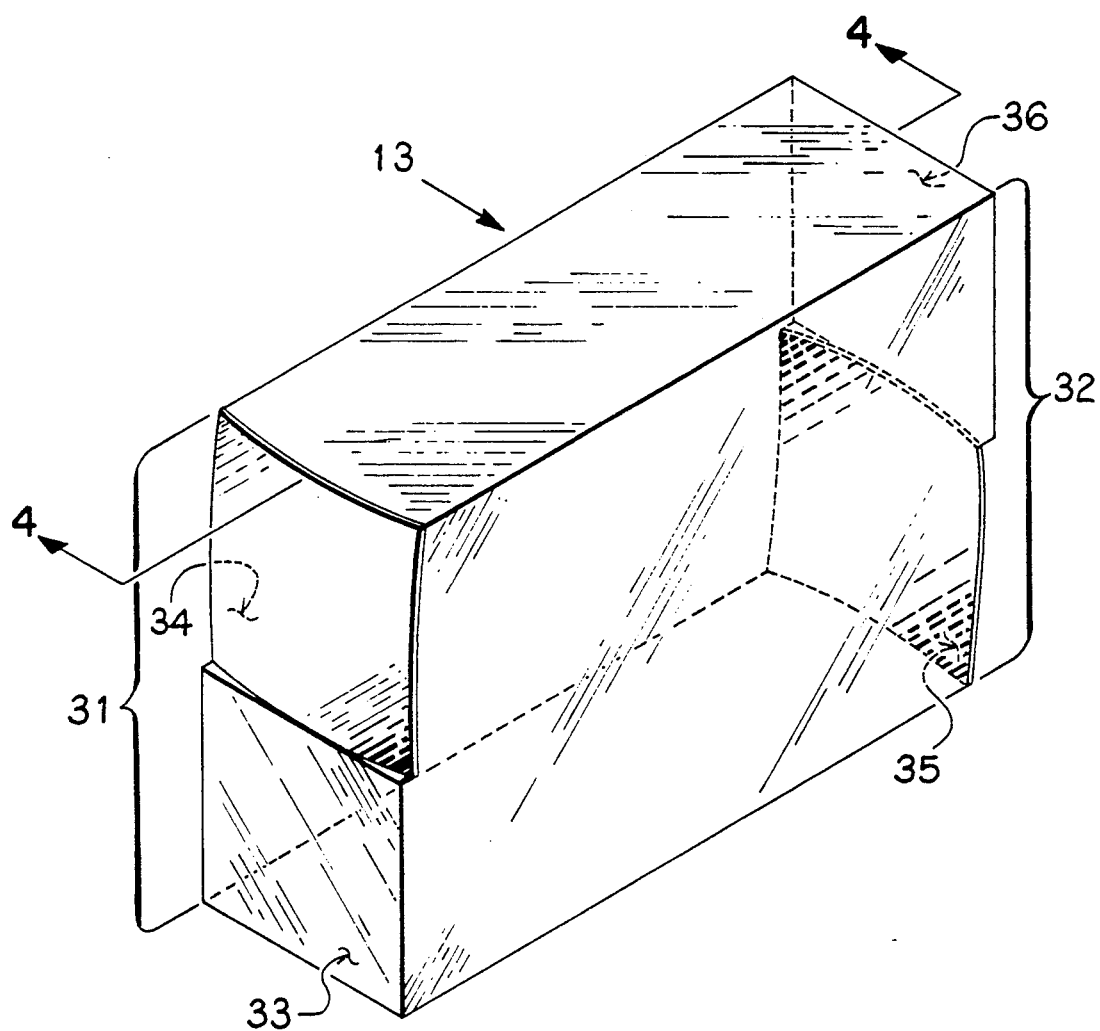

FIG_4
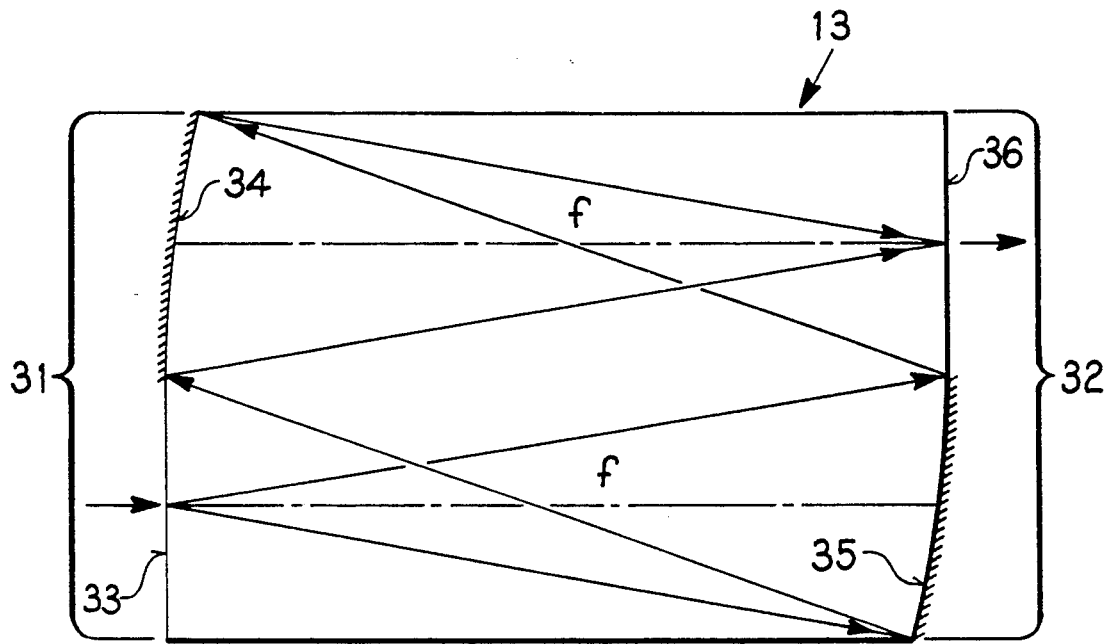
FIG_5
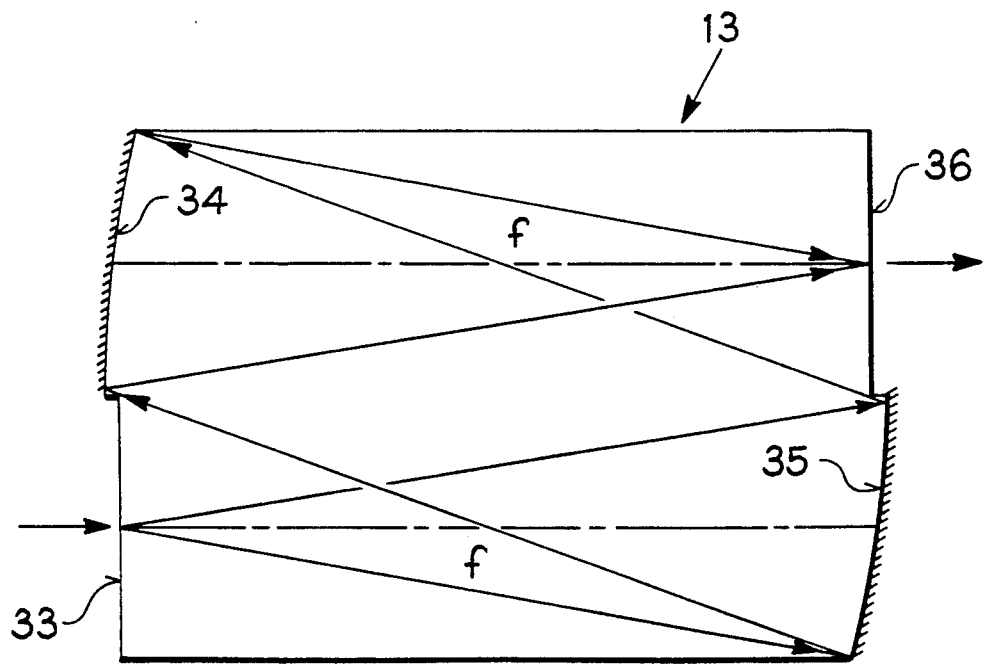

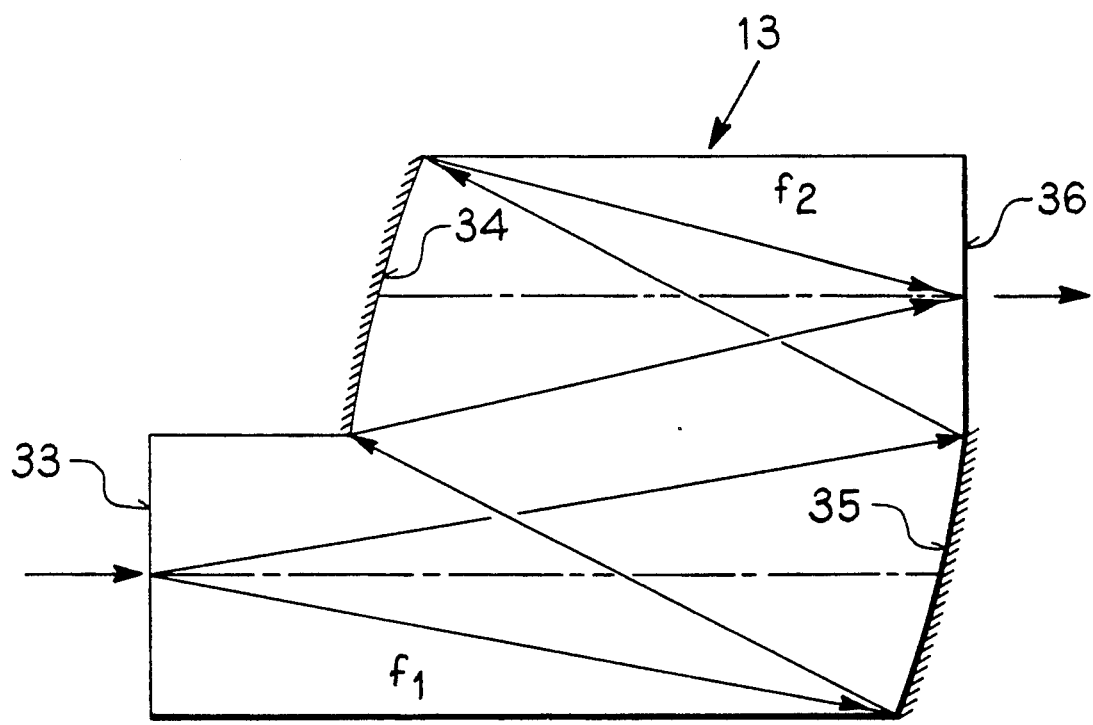

TEMPERATURE-INDEPENDENT OPTICAL COUPLER

TECHNICAL FIELD

This invention relates generally to optical coupling technology, and more particularly to an optical coupler that is unaffected by temperature fluctuations.

BACKGROUND ART

A typical optical coupler comprises several separate lens and mirror elements, which are mounted in specified locations on a structure called an optical table, and which have configurations and orientations with respect to each other that are precisely specified so that an optical signal entering the optical coupler from a source can be transmitted therethrough to a receiving device without significant distortion.

In an application in which a typical optical coupler is subjected to extreme temperature fluctuations (e.g., an extraterrestrial space application), thermal expansions and contractions of the optical table—and of the separate lens and mirror elements mounted thereon—can occur due to the temperature fluctuations. Such thermal expansions and contractions tend to produce changes in focal positions of the lens and mirror elements, and thereby to introduce significant distortions into optical signals being transmitted through the optical coupler. Such changes in the focal positions of the lens and mirror elements adversely affect the efficiency with which optical signals can be transmitted through optical coupler.

A need has been perceived in the prior art for an optical coupler that is substantially unaffected by extreme temperature fluctuations.

SUMMARY OF THE INVENTION

It is a general object of the present invention to provide an optical coupler that is substantially unaffected by extreme temperature fluctuations.

It is a more particular object of the present invention to provide an optical coupler of unitary construction, which undergoes substantially uniform thermal expansions and contractions under extreme temperature fluctuations so that optical signal distortion attributable to temperature fluctuations is substantially eliminated.

DESCRIPTION OF THE DRAWING

FIG. 1 is a block diagram of a representative optical system in which an optical coupler according to the present invention can be utilized.

FIG. 2 is a perspective view of a typical optical coupler of the prior art, which comprises separately mounted reflective elements.

FIG. 3 is a perspective view of a first embodiment of a monolithic optical coupler according to the present invention.

FIG. 4 is a profile view (i.e., a view in longitudinal cross section along line 4—4 of FIG. 3) of the monolithic optical coupler illustrated in FIG. 3, which has paraboloidal reflective surface portions.

FIG. 5 is a profile view (i.e., a view in longitudinal cross section) of a second embodiment of a monolithic optical coupler according to the present invention, which is generally similar to the embodiment of FIG. 4 except that the reflective surface portions are spherical.

FIG. 6 is a profile view (i.e., a view in longitudinal cross section) of a third embodiment of a monolithic optical coupler according to the present invention in which the reflective surface portions, which can be either paraboloidal or spherical, have different focal lengths so as to provide magnification.

BEST MODE OF CARRYING OUT THE INVENTION

In FIG. 1, a representative optical system is illustrated in which an electrical signal source 10 (e.g., a computer) produces electrical signals, which are processed by appropriate signal processing electronics 11 (which may be conventional) to control the output of an optical device 12 (e.g., a laser diode). The output of an optical device 12 consists of optical signals, which correspond in information content to the electrical signals produced by the electrical signal source 10.

As illustrated schematically in FIG. 1, the optical signals produced by the optical device 12 are coupled by means of an optical coupler 13 to a fiber optic device 14 for further processing and/or use. In a typical application, an input port of the optical coupler 13 is positioned in the focal region of the optical device 12, and an output port of the optical coupler 13 is positioned in the focal region of the fiber optic device 14. Thus, in practice, the distances between the optical device 12 and the optical coupler 13, and between the optical coupler 13 and the fiber optic device 14, can be vanishingly small.

In a particular application, the system illustrated in FIG. 1 must function in a thermally hostile environment—e.g., on board a satellite in earth orbit in which temperature can fluctuate over a range of 400° Celsius or more in a time span of only a few hours or less. With optical couplers of the prior art, the coupling of optical signals from the optical device 12 to the fiber optic device 14 often proved to be seriously inefficient, because thermal expansions and contractions resulting from such temperature fluctuations would produce changes in the focal positions of lens and mirror elements of the optical couplers—which tended to introduced distortions into the optical signals propagating through the optical couplers.

In FIG. 2, a typical optical coupler 13' of the prior art comprising separately mounted mirrors is illustrated. The optical coupler 13' comprises an optical table 20 on which an input lens system 21, a mirror 22, a mirror 23 and an output lens system 24 are mounted. The input lens system 21 (which may comprise a plurality of lens elements) functions to collect an optical signal impinging thereon or guided thereto—e.g., an optical signal produced by the optical device 12 in FIG. 1—and to configure the optical signal so gathered into a diverging beam, which is intercepted by the mirror 22. The mirror 22 is shaped and dimensioned to reflect and re-configure the diverging beam as a collimated beam incident upon the mirror 23. The mirror 23 is shaped and dimensioned to reflect and re-configure the collimated beam incident thereon into a converging beam, which is focussed onto the object plane of the output lens system 24. The output lens system 24 (which may likewise comprise a plurality of lens elements) functions to transform the converging beam into a collimated beam of suitable diameter for input to receiving device—e.g., the fiber optic device 14 in FIG. 1.

As illustrated in FIG. 2, the input lens system 21, the mirror 22, the mirror 23 and the output lens system 24 are separate components mounted at precisely specified locations on the optical table 20. The optical table 20 is typically made of a metal, which is subject to thermal expansions and contractions in response to extreme temperature fluctuations. In the absence of adequate thermal insulation and/or temperature control mechanisms to mitigate the effects of the extreme temperature fluctuations, the optical table 20 would expand and contract so as to change focal positions of the lens and mirror components of the optical coupler 13'. In extraterrestrial space applications, the weight of thermal insulation and temperature control mechanisms is ordinarily a significant adverse factor in system design.

Alternatively, in order to minimize the effects of extreme temperature fluctuations, the optical table 20 as illustrated in FIG. 2 could be made of a material that is substantially thermally invarient over a wide temperature range. An example of such a material is Invar metal alloy. However, such an alloy is relatively heavy and expensive. Furthermore, specialized hardware (which is generally heavy and expensive) would be required to mount the lens and mirror components on an Invar optical table. The weight of Invar metal alloy militates against its use in extraterrestrial space applications.

In FIG. 3, the optical coupler 13 of the present invention (as illustrated in FIG. 1) is shown in perspective view. The optical coupler 13 is a unitary structure—i.e., it comprises a monolithic piece of optically refractive material—of generally rectangular parallelepipedal configuration with two opposite sides 31 and 32, which are generally transverse to the direction of propagation of optical signals into and out of the optical coupler 13. A monolithic structure comprising the optical coupler 13 can be made of an optical-quality glass, fused quartz, crystalline quartz, rutile, sapphire, or even a colored material such as laser-quality synthetic ruby. It is also anticipated that a monolithic structure comprising the optical coupler 13 can be molded from a suitable plastic material.

As illustrated in FIG. 3, the side 31 of the optical coupler 13 has a lower surface portion 33 and an upper surface portion 34. The lower surface portion 33 of the side 31 is substantially planar, and is dimensioned to interface with an output means (e.g., an optical fiber or a channel waveguide) of the optical device 12. The upper surface portion 34 of the side 31 is of paraboloidal configuration, and is covered with a reflective coating (which can be provided by a conventional technique—e.g., vapor deposition, or sputtering). Also, the side 32 of the optical coupler 13 has a lower surface portion 35 and an upper surface portion 36. The lower surface portion 35 of the side 32 is of paraboloidal configuration and is covered with a reflective coating, while the upper surface portion 36 is substantially planar and is dimensioned to interface with an input means of the fiber optic device 14.

In experimental evaluations, it has been found that a 1490 Å coating of aluminum applied by a Varian "e-Beam" electron beam machine onto an approximated paraboloidal surface portion of a 0.25 in. thick monolithic structure made of optical glass provides substantially 100% internal reflection for wavelengths in the visible region of the electromagnetic spectrum.

As illustrated in FIG. 4, an optical signal enters the optical coupler 13 through the planar lower surface portion 33 of the side 31 as a diverging beam, which propagates internally within the optical coupler 13 to the reflective lower surface portion 35 of the side 32. The lower surface portion 35 of the side 32 is configured so that the optical signal incident thereon is "off-axis" with respect to the paraboloidal axis thereof, and so that the focus of the lower surface portion 35 of the side 32 effectively lies on the lower surface portion 33 of the side 31. The "off-axis" angle of incidence of the optical signal upon the lower surface portion 35 of the side 32 enables the optical coupler 13 to have a finite thickness between the opposite sides 31 and 32.

The optical signal is reflected by the lower surface portion 35 of the side 32 as a substantially collimated beam to the upper surface portion 34 of the side 31. The upper surface portion 34 of the side 31 is configured so that the optical signal incident thereon is "off-axis" with respect to the paraboloidal axis thereof, and so that the focus of the upper surface portion 34 of the side 31 effectively lies on the upper surface portion 36 of the side 32. In the embodiment illustrated in FIG. 4, the focal length f of the paraboloidal upper surface portion 34 of the side 31 is equal to the focal length f of the paraboloidal lower surface portion 35 of the side 32. The optical signal exiting from the optical coupler 13 at the planar upper surface portion 36 of the side 32 is substantially undistorted with respect to the optical signal entering the optical coupler 13 at the planar lower surface portion 33 of the side 31. Since the optical coupler 13 is monolithic, any expansions and contractions thereof attributable to extreme temperature fluctuations would be uniformly distributed throughout and would not introduce distortions into the optical signal propagating therethrough.

In FIG. 5, an alternative embodiment of the optical coupler 13 is illustrated in which the configurations of the reflective surface portions 34 and 35 are different from the configurations illustrated therefor in FIG. 4, so that a shorter focal length geometry is achieved. Also, in a particular application where a certain amount of signal degradation can be tolerated, the reflective surface portions 34 and 35 can be spherical approximations of paraboloidal surfaces—thereby reducing the cost of fabricating the optical coupler 13. As illustrated, the value of the focal length f for the reflective surface portions 34 and 35 is shorter for the embodiment of FIG. 5 than for the embodiment of FIG. 4.

In general, a shorter focal length geometry for the optical coupler 13 results in a shorter thickness between the opposite sides 31 and 32, and hence in a lower weight for the optical coupler 13. Also, a shorter focal length geometry results in an optically "faster" (i.e., a lower F/number) system. The optimal configuration for the reflective surface portions 34 and 35 depends upon the particular application intended for the optical coupler 13, and can be determined by an optical designer of ordinary skill in the art using a conventional optical design technique.

In FIG. 6, another embodiment of the optical coupler 13 is illustrated in which the focal length $f_2$ of the reflective surface portion 34 is significantly less than the focal length $f_1$ of the reflective surface portion 35. The optical coupler 13 as shown in FIG. 6 effectively reduces the diameter of the output beam from the optical device 12 in the ratio $f_2/f_1$, where $f_1 > f_2$. For a different application, the ratio of the focal lengths $f_2$ and $f_1$ could be designed so that $f_2 > f_1$, whereby the optical coupler 13 would function as a beam expander.

It is anticipated that in particular applications, the paraboloidal portions 34 and 35 of the sides 31 and 33, respectively, of the optical coupler 13 could be replaced by spherical surface portions that adequately approximate paraboloidal surface portions in focussing effect.

The present invention has been described above in terms of particular embodiments, which are appropriate for use in particular applications. However, other embodiments more suitable for use in other applications would become apparent to practitioners skilled in the art upon perusal of the foregoing description and accompanying drawing. Such other embodiments would likewise be within the scope of the present invention. Accordingly, the present invention is defined more generally by the following claims and their equivalents.

We claim:

1. An apparatus for coupling an optical signal of specified wavelength from a first device to a second device, said coupling apparatus comprising a monolithic structure made of a material that is substantially transparent to electromagnetic radiation of said specified wavelength, said coupling apparatus being of generally parallelopipedal configuration with a pair of opposite sides disposed to extend transversely with respect to a direction of propagation of said optical signal, a first one of said pair of opposite sides of said coupling apparatus having:
   a) a substantially planar surface portion through which said optical signal can enter into said coupling apparatus, and
   b) a generally conicoidal surface portion covered with a material that substantially reflects electromagnetic radiation of said specified wavelength,
a second one of said pair of opposite sides of said coupling apparatus having:
   a) a generally conicoidal surface portion covered with a material that substantially reflects electromagnetic radiation of said specified wavelength, and
   b) a substantially planar surface portion through which said optical signal can exit from said coupling apparatus,
said planar and conicoidal surface portions of said opposite sides of said coupling apparatus being configured and positioned with respect to each other so that said optical signal entering into said coupling apparatus through said planar surface portion of said first one of said opposite sides is:
   (i) reflected internally within said coupling apparatus from said conicoidal surface portion of said second one of said opposite sides to said conicoidal surface portion of said first one of said opposite sides, and is thereupon
   (ii) reflected internally within said coupling apparatus from said conicoidal surface portion of said first one of said opposite sides to said planar surface portion of said second one of said opposite sides,
said optical signal exiting from said coupling apparatus through said planar surface portion of said second one of said opposite sides, said coupling apparatus undergoing substantially uniformly distributed expansions and contractions in response to fluctuations in temperature.

2. The optical coupling apparatus of claim 1 wherein said conicoidal surface portions of said opposite first and second sides of said coupling apparatus are of generally parabaloidal configuration.

3. The optical coupling apparatus of claim 2 wherein said paraboloidal surface portions of said opposite first and second sides of said coupling apparatus have substantially the same focal length.

4. The optical coupling apparatus of claim 2 wherein said paraboloidal surface portions of said opposite first and second sides of said coupling apparatus have different focal lengths.

5. The optical coupling apparatus of claim 2 wherein said spherical surface portions of said opposite first and second sides of said coupling apparatus have different focal lengths.

6. The optical coupling apparatus of claim 1 wherein said conicoidal surface portions of said opposite first and second sides of said coupling apparatus are of generally spherical configuration.

7. The optical coupling apparatus of claim 6 wherein said spherical surface portions of said opposite first and second sides of said coupling apparatus have substantially the same focal length.

8. The optical coupling apparatus of claim 1 wherein said monolithic structure is molded from a plastic material.

* * * * *